United States Patent [19]

Reffert et al.

[11] Patent Number: 4,503,219

[45] Date of Patent: Mar. 5, 1985

[54] TREATMENT OF (CO)POLYMERS TO REMOVE RESIDUAL MONOMERS

[75] Inventors: Rudi W. Reffert, Beindersheim; Juergen Hambrecht, Heidelberg; Rudolf H. Jung, Worms; Adolf Echte, Ludwigshafen, all of Fed. Rep. of Germany

[73] Assignee: BASF Aktiengesellschaft, Fed. Rep. of Germany

[21] Appl. No.: 489,558

[22] Filed: Apr. 28, 1983

[30] Foreign Application Priority Data

Apr. 29, 1982 [DE] Fed. Rep. of Germany ....... 3215911

[51] Int. Cl.³ .......................... C08F 6/00; C08G 6/00; C08J 3/00
[52] U.S. Cl. .................................... 528/481; 525/289; 528/492; 528/493; 528/494; 528/497; 528/486; 528/487
[58] Field of Search ................ 525/289; 528/492, 493, 528/494, 497, 481, 486, 487

[56] References Cited

U.S. PATENT DOCUMENTS 2,917,479 12/1959 Van Raamsdonk et al. ... 528/497 X
3,873,643 3/1975 Wu et al. .......................... 525/289 X
3,882,194 5/1975 Krebaum et al. ................ 525/289 X
4,124,658 11/1978 Camerman ...................... 260/880 R
4,215,024 7/1980 Gomez et al. ..................... 260/23 S
4,215,085 7/1980 Gomez ............................... 264/15
4,228,119 10/1980 Gomez et al. ...................... 264/211

FOREIGN PATENT DOCUMENTS 582721 11/1946 United Kingdom ............... 525/289

Primary Examiner—Joseph L. Schofer
Assistant Examiner—S. Babajko
Attorney, Agent, or Firm—Keil & Weinkauf

[57] ABSTRACT (Co)polymers which are composed of one or more monomers from the group comprising
(a) the vinyl-aromatic monomers and
(b) the ethylenically unsaturated monomers
and furthermore contain one or more monomer components (a) or (b), or (a) and (b), as unreacted residual monomers are treated at above the glass temperature of the (co)polymer and in the presence of one or more assistants, which have been added to the (co)polymer. The assistant used is a bicyclic compound of the general formula I

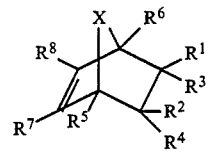

where X is a methylene, ethylene, 1,1-ethenyl, 1,2-ethenyl, carbonyl, azo, amino, ether or thioether group which is unsubstituted or substituted by halogen, alkyl, alkenyl, cycloalkyl, aryl, carboxyl, carboxyalkyl, an ether group or a thioether group, $R^1$, $R^2$, $R^3$ and $R^4$ are each hydrogen, halogen, alkyl, alkenyl, cycloalkyl, aryl, carboxyalkyl or nitrile, $R^5$ and $R^6$ are each hydrogen, halogen, alkyl or carboxyalkyl, and $R^7$ and $R^8$ are each hydrogen, halogen, alkyl, alkenyl, aryl, carboxyalkyl, carboxyl or nitrile.

6 Claims, No Drawings

TREATMENT OF (CO)POLYMERS TO REMOVE RESIDUAL MONOMERS

Thermoplastic polymers, such as polystyrene, high-impact polystyrene (HIPS), styrene/acrylonitrile (SAN) copolymers, acrylonitrile/butadiene/styrene (ABS) copolymers, polymethyl methacrylate, styrene/maleic anhydride (SMSA) copolymers, nylons, and acrylonitrile polymers of the barrier type (Ullmanns Encyclopädie der technischen Chemie, volume 19, page 275, Verlag Chemie, Weinheim, 1980) are freed, in separate devolatilization steps, from unreacted monomers and from assistants, such as solvents. This step is necessary, as a rule, regardless of the method employed to prepare the polymer, ie. in any conventional process, such as mass, solution, mass/suspension, emulsion or precipitation polymerization, any residual monomers still present in the polymer have to be removed.

A very large variety of methods have been employed to achieve this. The conventional method comprises devolatilization in single-stage or multi-stage units, as described in, for example, U.S. Pat. Nos. 2,727,884 and 2,941,935. However, the thermoplastic resins prepared by means of these processes frequently still contain residual amounts of monomers, and consequently cannot be used, for example, in the foodstuffs packaging sector or in articles which are in contact with foodstuffs over a long period of time.

It has therefore been proposed that the residual monomers in these polymers be removed by irradiation with electrons. This procedure reduces the content of residual monomers but at the same time the polymers become noticeably yellow and undergo partial crosslinking. Moreover, the equipment employed is very expensive and its operation is very energy-consumptive.

The use of assistants to remove the residual monomers has also been proposed.

The relevant prior art includes (1) U.S. Pat. No. 4,124,658, (2) U.S. Pat. No. 4,215,085, (3) U.S. Pat. No. 4,215,024 and (4) U.S. Pat. No. 4,228,119.

(1) describes the subsequent chemical devolatilization of styrene polymers with sulfonic acid hydrazides. This method has the disadvantage that the residual monomers are not removed to an adequate extent.

(2), (3) and (4) describe the use of reaction products of olefinic alcohols with fatty acids, cyanuric acid and fatty acid aldehydes or unsaturated fatty acids, eg. oleic acid, or glycerides of unsaturated fatty acids, eg. Linoleic acid or oleic acid, or linseed oil for subsequent chemical devolatilization, in particular for removing monomeric acrylonitrile by trapping reactions. These methods have the disadvantage that the resulting polymers exhibit substantial yellowing and, in some cases, the residual monomers have not been removed to an adequate extent.

It is an object of the present invention to prepare polymers having a reduced content of residual monomers, without it being necessary to employ additional devolatilization units for this purpose. The method should be capable of achieving devolatilization to a residual monomer content which is sufficiently low to permit the polymers to be employed, without the risk of contamination, for packaging foodstuffs. Moreover, removing the residual monomers should not alter the properties of the polymers.

We have found that this object is achieved by a method as defined in claim 1.

The method according to the invention and the composition of the (co)polymers are described below.

The novel method can be used for all (co)polymers composed of one or more monomers from the group comprising
(a) the vinyl-aromatic monomers and
(b) the ethylenically unsaturated monomers.

Particularly suitable vinyl-aromatic monomers are styrene, p-methylstyrene and α-methylstyrene.

Particularly suitable ethylenically unsaturated monomers are the esters of acrylic and methacrylic acid with alcohols of 1 to 10 carbon atoms, acrylonitrile (AN) and maleic anhydride (MA).

Virtually all thermoplastic resins and modified polymers which are composed of the vinyl-containing monomers (a) and/or (b) and in which it is intended to reduce the content of residual monomers can be employed as polymers. Relatively low molecular weight polymers, in the presence or absence of a solvent or as a dispersion, may also be subsequently devolatilized with the aid of the compounds of the formula I. The method is particularly useful in the case of modified and non-modified polystyrene, styrene copolymers, eg. SAN, SMA and SMMA copolymers, ABS, ASA, ACS and MBS resins, impact-resistant SMA copolymers, impact-resistant polymethyl methacrylates, nylons, barrier plastics with a high acrylonitrile content, and acrylonitrile polymers.

Modified and non-modified thermoplastic styrene polymers, styrene copolymers, acrylonitrile polymers and copolymers, methacrylate polymers and copolymers and acrylate polymers and copolymers are particularly preferably employed in the procedure for removing residual monomers.

The method according to the invention is carried out at above the glass temperature of the (co)polymer, which can be from 50° to 150° C. The reaction takes place in the presence of a cyclic compound of the formula I (a Diels-Alder adduct) as the assistant. The decomposition temperature of the chosen compound of the formula I should be from 50° to 200° C. above the glass temperature of the (co)polymer to be devolatilized, ie. the said decomposition temperature should be from 50° to 350° C., preferably from 100° to 300° C.

The compound of the formula I is advantageously employed in an amount of from 0.5 to 200, preferably from 1 to 50, moles per mole of residual vinyl-containing monomer (a) and/or (b).

Mixing of the (co)polymer and the assistant is preferably carried out in an extruder, advantageously in a single-screw or twin-screw extruder, but it is also possible to use other units which permit thorough mixing, for example static mixers with Kenics or Sulzer mixing elements as well as dynamic pin mills.

Mixing of the polymer with the compound of the formula I is advantageously carried out for from 0.2 to 20 minutes, depending on the mixing efficiency of the particular unit. Where an extruder is employed, the residence time is advantageously from 20 to 180 seconds, the mixing time required being determined by the melt viscosity of the polymer. The required residence time range can be set by varying the temperature.

An essential feature of the novel method is that it is carried out using one or more bicyclic or polycyclic compounds of the general formula I

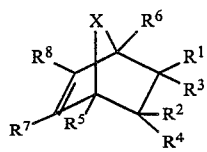

where X is methylene, ethylene, 1,1-ethenyl, 1,2-ethenyl, carbonyl, azo, amino, ether or thioether group which is unsubstituted or substituted by alkyl, alkenyl, cycloalkyl, aryl, carboxyl, carboxyalkyl, an ether group or a thioether group, $R^1$, $R^2$, $R^3$ and $R^4$ are each hydrogen, halogen, alkyl, alkenyl, cycloalkyl, aryl, carboxyalkyl or nitrile, $R^5$ and $R^6$ are each hydrogen, halogen, alkyl or carboxyalkyl, and $R^7$ and $R^8$ are each hydrogen, halogen, alkyl, alkenyl, aryl, carboxyalkyl, carboxyl or nitrile.

Furthermore, $R^1$ and $R^2$ together, or $R^3$ and $R^4$ together, may be one of the following groups:

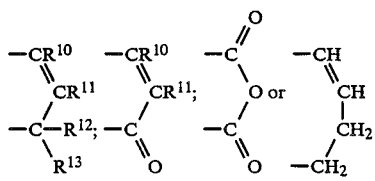

where $R^{10}$, $R^{11}$, $R^{12}$ and $R^{13}$ are each hydrogen, alkyl, alkenyl, aryl, carboxyalkyl, carboxyl, an acyl halide group or an acylamide group.

Particularly preferred compounds of the formula I are Diels-Alder adducts which are derived from tricyclo[5.2.1.0$^{2,6}$]deca-3,8-diene, tricyclo[6.2.2.0$^{2,7}$]dodeca-3,8-diene, bicyclo[2.2.1]hept-2-ene, bicyclo[2.2.2]oct-2-ene or bicyclo[2.2.2]octa-2,5-diene, or which correspond to these products. Compounds of this type are tricyclo[5.2.1.0$^{2,6}$]deca-3,8-dien-5-one, 4,9-bis-carboxymethyltricyclo[5.2.1.0$^{2,6}$]deca-3,8-diene, 4,9-bis-carbonitriletricyclo[5.2.1.0$^{2,6}$]deca-3,8-diene, 1,4-bis-carboxymethyltricyclo[5.2.1.0$^{2,6}$]deca-3,8-diene, bicyclo[2.2.2]oct-2-ene-5,6-dicarboxylic anhydride, 2,3-dimethyl-7-isopropylbicyclo[2.2.2]oct-2-ene-5,6-dicarboxylic anhydride and 1-methyl-4-isopropylbicyclo[2.2.2]octa-2,5-diene-7,8-dicarboxylic anhydride, to name but a few examples, without restricting the invention to these. The preparation of such Diels-Alder products is known per se (cf. German Published Applications DAS No. 1,569,021 and DAS No. 1,569,032).

The point in time at which the novel method is carried out can be readily determined by a skilled worker on the basis of the circumstances prevailing and the polymerization process employed. Thus, the novel method can be used directly after the polymerization, or the major part of the solvent and unreacted monomers can be evaporated before the novel method is employed. It can also be carried out after the (co)polymer has been dried, and may be combined with the compounding step or may precede this.

Mixing the (co)polymer with the compound of the formula I is preferably carried out at above the glass temperature of the (co)polymer and at above the decomposition temperature of the cyclic compounds. Regarding the definition of the glass temperature, reference may be made to Ullmanns Encyclopädie der technischen Chemie, Verlag Chemie Weinheim, volume 18, pages 594 and 595. Mixing may be carried out under atmospheric or superatmospheric pressure, either continuously or batchwise.

Compared with the conventional methods, the method according to the invention gives (co)polymers with a substantially lower amount of residual monomers. These polymers are therefore very useful for packaging foodstuffs. Removal of the residual monomers takes place as a result of their chemical conversion. Using the method according to the invention, it is possible to bring about a drastic reduction in the content of residual monomers in polymers, without additional devolatilization units being required for this purpose, and without the polymers yellowing or undergoing crosslinking as a result of this procedure.

All these advantageous results are surprising in view of the prior art.

The devolatilized polymers obtainable by the method of the invention are useful starting materials for a large number of plastic articles, in particular for plastics which come into contact with foodstuffs, for example when used for packaging.

In the Examples which follow, parts are by weight.

EXAMPLE 1

A styrene/acrylonitrile copolymer having a mean molecular weight $\overline{M}_w$ of $1.4 \times 10^5$, an AN content of 25% and a residual monomer content of 2,340 ppm of styrene and 68 ppm of acrylonitrile is mixed thoroughly with 1%, based on the SAN polymer, of tricyclo[5.2.1.0$^{2,6}$]deca-3,8-diene in a twin-screw extruder, and the mixture is then extruded.

Mixing is carried out at 250° C. for 4 minutes. After extrusion, the SAN copolymer has a reduced residual monomer content of 1,640 ppm of styrene and 5 ppm of acrylonitrile, has not undergone yellowing, is completely soluble and has mechanical properties corresponding to those of the starting material.

EXAMPLE 2

A styrene/acrylonitrile copolymer having a mean molecular weight $\overline{M}_w$ of $1.2 \times 10^5$, an AN content of 35% and a residual monomer content of 4,250 ppm of styrene and 500 ppm of acrylonitrile is thoroughly mixed with 0.5%, based on the SAN polymer, of tricyclo[5.2.1.0$^{2,6}$]deca-3,8-diene in a twin-screw extruder, and the mixture is then extruded.

Mixing is carried out at 260° C. for 4 minutes. After extrusion, the SAN copolymer has a reduced residual monomer content of 2,700 ppm of styrene and 87 ppm of acrylonitrile, has not undergone yellowing, is completely soluble and has mechanical properties corresponding to those of the starting material.

EXAMPLE 3

The polymer described in Example 2 is employed with 1.0% of tricyclo[5.2.1.0$^{2,6}$]deca-3,8-diene under corresponding conditions (260° C., residence time: 4 minutes). After extrusion, the SAN copolymer still contains 1,800 ppm of styrene and 10 ppm of acrylonitrile, while its other properties once again remain unchanged.

EXAMPLE 4

An ASA polymer which comprises 17.5% by weight of polybutyl acrylate, based on the ASA polymer, as the soft component, and an SAN copolymer, containing 25% by weight of AN, based on the SAN copolymer, and having an $\overline{M}_w$ of $1.3 \times 10^5$, as the hard component, and has a residual monomer content of 1,900 ppm of styrene and 45 ppm of acrylonitrile, is compounded, together with 0.5% of tricyclo[5.2.1.0$^{2,6}$]deca-3,8-diene, at 240° C. for 3 minutes in a single-screw extruder. After compounding, the polymer still contains 860 ppm of styrene and 5 ppm of acrylonitrile, and its mechanical properties are unchanged.

EXAMPLE 5

An SAN copolymer containing 70% of acrylonitrile and having an $\overline{M}_w$ of $1.4 \times 10^5$ and a residual monomer content of 120 ppm of acrylonitrile and 190 ppm of styrene is compounded, together with 0.8% of tricyclo[5.2.1.0$^{2,6}$]deca-3,8-diene, at 230° C. for 4 minutes in a single-screw extruder. After compounding, the barrier plastic has a residual monomer content of 5 ppm of acrylonitrile and 100 ppm of styrene.

EXAMPLE 6

A styrene/methyl methacrylate copolymer containing 50% of methyl methacrylate and having an $\overline{M}_w$ of $1.2 \times 10^5$ and a residual monomer content of 1,900 ppm of styrene and 820 ppm of methyl methacrylate is compounded, together with 1.0% of tricyclo[5.2.1.0$^{2,6}$]deca-3,8-diene, at 210° C. for 4 minutes in a twin-screw extruder. After compounding, the copolymer still contains 1,840 ppm of styrene and 45 ppm of methyl methacrylate.

EXAMPLE 7

The polymer described in Example 1 is reacted with 1% of tricyclo[6.2.2.0$^{2,7}$]dodeca-3,9-diene at 280° C. for 2 minutes. After extrusion, the SAN copolymer still contains 1,760 ppm of styrene and 10 ppm of acrylonitrile, while its other properties are unchanged.

EXAMPLE 8

The polymer described in Example 2 is reacted with 1% of 4,9-bis-carboxymethyltricyclo[5.2.1.0$^{2,6}$]deca-3,8-diene at 230° C. for 5 minutes. The resulting polymer still contains 1,400 ppm of styrene and 22 ppm of acrylonitrile, but is otherwise unchanged.

EXAMPLE 9

The SAN polymer described in Example 1 is reacted with 1% of 1-methyl-4-isopropylbicyclo[2.2.2]octa-2,5-diene-7,8-dicarboxylic anhydride at 250° C. for 4 minutes. The resulting polymer contains 1,420 ppm of styrene and 8 ppm of acrylonitrile, but is otherwise unchanged.

EXAMPLE 10

The polymer described in Example 2 is reacted with 1% of 7,7-trimethylbicyclo[2.2.1]hept-2-ene at 240° C. for 6 minutes. The SAN polymer then has a residual monomer content of 2,800 ppm of styrene and 56 ppm of acrylonitrile, but is otherwise unchanged.

We claim:

1. A method of removing residual vinyl-aromatic and/or ethylenically unsaturated monomer(s) from a (co)polymer which is composed of one or more monomers from the group comprising (a) styrene, p-methylstyrene and alpha-methylstyrene and (b) acrylates, methacrylates, acrylonitrile and maleic anhydride which method comprises: adding to the (co)polymer and residual monomer(s) one or more bicyclic compounds of the formula I

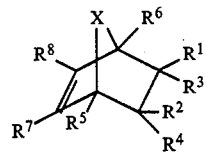

where X is methylene, ethylene, 1,1-ethenyl, 1,2-ethenyl, carbonyl, azo, amino, ether or thioether group which is unsubstituted or substituted by alkyl, alkenyl, cycloalkyl, aryl, carboxyl, carboxyalkyl, an ether group or a thioether group, $R^1$, $R^2$, $R^3$ and $R^4$ are each hydrogen, alkyl, alkenyl, cycloalkyl, aryl, carboxyalkyl, or nitrile, $R^5$ and $R^6$ are each hydrogen, alkyl or carboxyalkyl, and $R^7$ and $R^8$ are each hydrogen, alkyl, alkenyl, aryl, carboxyalkyl, carboxyl or nitrile; thoroughly mixing said compound or compounds of the formula I and said (co)polymer and residual monomer or monomers at a temperature above the glass temperature of the (co)polymer whereby the compound or compounds of the formula I are decomposed and the mixture is devolatilized to remove residual monomer or monomers.

2. A method of removing residual vinyl-aromatic and/or ethylenically unsaturated monomer(s) from a (co) polymer having a glass transition temperature in the range of from 50° to 150° C. and which is composed of one or more monomers from the group consisting of (a) styrene, p-methylstyrene and alpha-methylstyrene, and (b) acrylates, methacrylates, acrylonitrile and maleic anhydride, which method comprises:

(a) adding a treating assistant to said (co) polymer and residual monomer(s) in an amount of from 0.5 to 200 moles per mole of residual monomer, said treating assistant being characterized by a decomposition temperature which is from 50° to 200° C. above the glass transition temperature of said (co) polymer and consists of one or more bicyclic compounds of the formula I

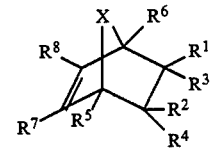

where X is methylene, ethylene, 1,1-ethenyl, 1,2-ethenyl, carbonyl, azo, amino, ether or thioether group which is unsubstituted or substituted by alkyl, alkenyl, cycloalkyl, aryl, carboxyl, carboxyalkyl, an ether group or a thioether group, $R^1$, $R^2$, $R^3$ and $R^4$ are each hydrogen, alkyl, alkenyl, cycloalkyl, aryl, carboxyalkyl, or nitrile, $R^5$ and $R^6$ are each hydrogen, alkyl or carboxyalkyl, and $R^7$ and $R^8$ are each hydrogen, alkyl, alkenyl, aryl, carboxyalkyl, carboxyl or nitrile;

(b) then mixing the added treating assistant with said (co) polymer and residual monomer(s) at a temperature which is above both the decomposition temperature of said treating assistant and the glass transition temperature of said (co) polymer wherein the resulting mixture is devolatilized with consequent removal of said residual monomer or monomers.

3. The method of claim 2, wherein the treatment of the (co)polymer and the assistants is carried out in a mixing unit at from 200° to 300° C. for from 0.2 to 20 minutes.

4. The method of claim 3, wherein the assistant used is tricyclo[5.2.1.0$^{2,6}$]deca-3,8-diene or tricyclo[6.2.2.0$^{2,7}$]dodeca-3,9-diene or 4,9-bis-carboxymethyltricyclo[5.2.1.0$^{2,6}$]deca-3,8-diene or 1-methyl-4-isopropylbicyclo[2.2.2]octa-2,5-diene-7,8-dicarboxylic anhydride.

5. The method of claim 3, wherein the (co)polymers used are SAN polymers, ASA polymers or SMMA polymers, or a mixture of any of these.

6. The method of claim 3, wherein the assistant used is tricyclo[5.2.1.0$^{2,6}$]deca-3,8-diene or tricyclo[6.2.2.0$^{2,7}$]dodeca-3,9-diene or 4,9-bis-carboxymethyltricyclo[5.2.1.0$^{2,6}$]deca-3,8-diene.

* * * * *